(12) United States Patent
Ferguson

(10) Patent No.: US 8,441,245 B2
(45) Date of Patent: May 14, 2013

(54) HYSTERETIC VOLTAGE CONVERTER WITH OFFSET VOLTAGE CORRECTION

(75) Inventor: Bruce Ferguson, Anaheim, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 63 days.

(21) Appl. No.: 13/305,759

(22) Filed: Nov. 29, 2011

(65) Prior Publication Data

US 2012/0139507 A1    Jun. 7, 2012

Related U.S. Application Data

(60) Provisional application No. 61/419,840, filed on Dec. 5, 2010.

(51) Int. Cl.
*G05F 1/40* (2006.01)

(52) U.S. Cl.
USPC .......................................... 323/284; 323/271

(58) Field of Classification Search .................. 323/222, 323/271, 282–284, 351
See application file for complete search history.

(56) References Cited

U.S. PATENT DOCUMENTS

| | | | |
|---|---|---|---|
| 6,801,026 B2 | 10/2004 | Schrom et al. | |
| 6,853,174 B1 * | 2/2005 | Inn | 323/285 |
| 6,940,323 B2 * | 9/2005 | Katoh et al. | 327/156 |
| 7,773,016 B2 * | 8/2010 | Miao | 341/142 |
| 8,085,022 B2 * | 12/2011 | Chen et al. | 323/282 |
| 2011/0199145 A1 * | 8/2011 | Kawai et al. | 327/419 |

OTHER PUBLICATIONS

Yanming et al; A Current Mode Buck DC-Dc Controller With Adaptive On Time Control; Journal of Semiconductors, vol. 30, No. 2, Feb. 2009, Published by Chinese Institute of Electronics.

* cited by examiner

*Primary Examiner* — Jessica Han
(74) *Attorney, Agent, or Firm* — Simon Kahn

(57) ABSTRACT

A hysteretic power converter wherein an additional adjustment circuit, implemented as an offset correction loop, adds an offset to the comparator detection function to reduce the difference between the average output voltage and the regulation set point voltage. The adjustment circuit lies outside the main hysteretic regulation loop and therefore does not substantially impact the response time of the hysteretic loop, and is slow acting responsive to a low pass filter.

11 Claims, 4 Drawing Sheets

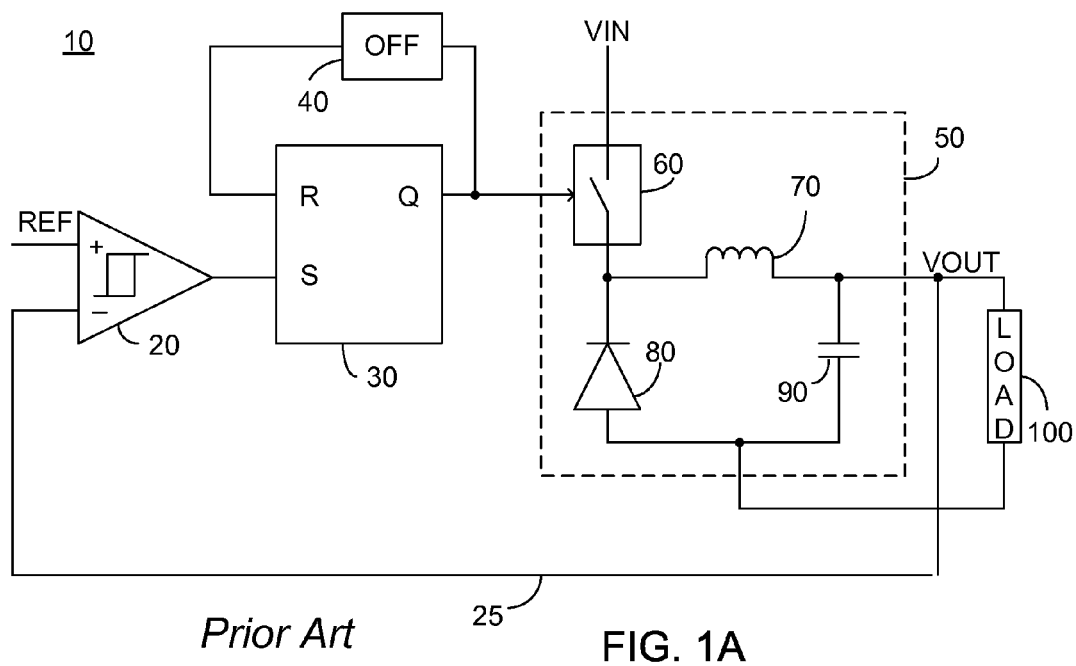
*Prior Art*     FIG. 1A
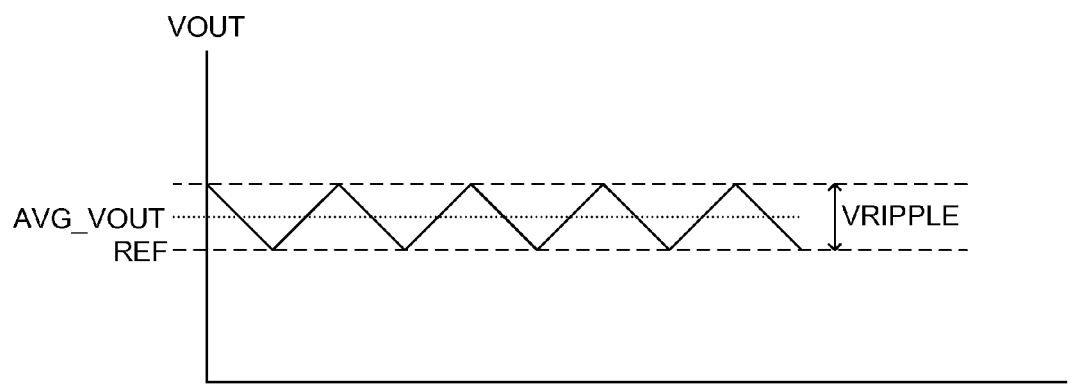
*Prior Art*     FIG. 1B

HYSTERETIC VOLTAGE CONVERTER WITH OFFSET VOLTAGE CORRECTION

CROSS-REFERENCE TO RELATED APPLICATIONS

This application claims priority from U.S. Provisional Patent Application Ser. No. 61/419,840 filed Dec. 5, 2010 entitled "Hysteretic Voltage Converter with Offset Voltage Correction", the entire contents of which is incorporated herein by reference.

BACKGROUND OF THE INVENTION

The present invention relates to the field of power converters, and in particular to a hysteretic converter wherein correction for the offset from a target voltage is supplied.

Various schemes of controlling a DC to DC power converter are known. Typically, one of output voltage and output current are sensed and fedback to the controller via an error amplifier, the error amplifier arranged to operate in a linear mode. A reference value, reflective of a target output, is further received by the error amplifier, and differences in output from the target output are detected and compensated for, typically by adjusting the amount of time that an electronically controlled switch is closed. In such an embodiment, the output voltage or current varies about the target output, and the average output over time may equal the target output. Such a linear regulation control however is inappropriate when a quick reaction to large changes in load is required.

In order to overcome this difficulty, a hysteretic converter is utilized. The hysteretic converter comprises at least one electronically controlled switch, a comparator and an inductor, the electronically controlled switch being closed responsive to the output of the comparator. The comparator is arranged to close the electronically controlled switch promptly responsive to the instantaneous output voltage falling below a first reference signal, thus driving the output voltage higher without the delay of an integrator or other low bandwidth circuitry. Various schemes for opening the electronically controlled switch exist, including, but not limited to, comparing the output voltage to a second reference and defining a predetermined fixed on time for the electronically controlled switch.

FIG. 1A illustrates a high level schematic diagram of a hysteretic converter 10 of the prior art, and FIG. 1B illustrates certain waveforms of hysteretic converter 10 of FIG. 1A, with the x-axis representing time and the y-axis representing the amplitude of output voltage VOUT, FIGS. 1A and 1B being described herein together. Hysteretic converter 10 comprises: a comparator 20 illustrated as a Schmidt trigger comparator; an RS flip flop 30; an off time control circuit 40; a switched mode power supply 50, illustrated without limitation without limitation as a buck converter constituted of an electronically controlled switch 60, an inductor 70, a unidirectional electronic valve 80 illustrated without limitation as a diode and an output capacitor 90. Additionally a load 100 is further illustrated. An input voltage VIN is connected to a first end of electronically controlled switch 60, and a second end of electronically controlled switch 60 is connected to a first end of inductor 70 and to the cathode of unidirectional electronic valve 80. A second end of inductor 70, denoted output voltage VOUT, is connected to a first end of output capacitor 90 and to a first end of load 100. A second end of load 100, a second end of output capacitor 90 and the anode of unidirectional electronic valve 80 are commonly connected.

Output voltage VOUT is connected to the inverting input of comparator 20 via a feedback circuit 25, and a reference voltage REF is connected to the non-inverting input of comparator 20. The output of comparator 20 is connected to the set input of RS flip flop 30 and the Q output of RS flip flop 30 is connected to the control input of electronically controlled switch 60 of switched mode power supply 50. An input of off time control circuit 40 is connected to the Q output of RS flip flop 30, and the output of off time control circuit 40 is connected to the reset input of RS flip flop 30. Output voltage VOUT is illustrated as being fed directly to the inverting input of comparator 20, however this is not meant to be limiting in any way, and in an exemplary embodiment a function of output voltage VOUT, such as a voltage divided output consonant with reference voltage REF is fed back to the input of comparator 20, preferably any function being without active devices which result in a reduced bandwidth for response to changes in load 100.

In operation, when output voltage VOUT falls to less than the threshold value signal fed to the non-inverting input of comparator 20, i.e. reference voltage REF, comparator 20 closes electronically controlled switch 60 by setting RS flip flop 30 thus increasing output voltage VOUT. Electronically controlled switch 60 remains closed after output voltage VOUT is increased by the latching action of RS flip flop 30. Off time control circuit 40, illustrated without limitation as a fixed on time timer, shuts off electronically controlled switch 60 after a predetermined interval, thus allowing output voltage VOUT to again fall responsive to the draw of load 100. Off time control circuit 40 may be replaced with a fixed off time circuitry, or a high side comparator, without limitation. The arrangement of the feedback circuit, comparator 20 and electronically controlled switch 60 is known as a hysteretic loop and responds rapidly to changes in VOUT. Output voltage VOUT swings between the threshold value signal reference voltage REF and an upper limit set by off time control circuit 40, with the voltage swing denoted VRIPPLE. The average output voltage, denoted AVG_VOUT, is equal to: REF+½ (VRIPPLE), i.e. it is offset from reference voltage REF by ½ of the ripple voltage.

Thus, the value of average output voltage AVG_VOUT is not directly controlled by reference voltage REF, but is instead a function of the ripple voltage. What is desired, and not provided by the prior art, is a mechanism to directly control average output voltage AVG_VOUT in a hysteretic controller, while still maintaining the immediate response to load transients of the hysteretic controller.

SUMMARY OF THE INVENTION

Accordingly, it is a principal object of the present invention to overcome at least some of the disadvantages of the prior art. This is provided in certain embodiments by a hysteretic converter wherein an additional adjustment circuit, implemented as an offset correction control loop, adds an offset to the comparator detection function to reduce the difference between the average output voltage and the regulation set point voltage, e.g. the reference input signal. The adjustment circuit lies outside the main hysteretic regulation loop and therefore does not substantially impact the response time of the hysteretic loop. In one embodiment the threshold value signal is adjusted so as reduce the offset, and in another embodiment the feedback signal is adjusted so as to reduce the offset.

In one embodiment a hysteretic power converter is enabled comprising: a reference input signal; a switched mode power supply comprising an inductor and an electronically controlled switch, wherein the output of the switched mode power supply increases responsive to a first state of the electronically controlled switch and decreases responsive to a second state of the electronically controlled switch, the second state opposing the first state; a comparator coupled to a feedback signal and a threshold value signal and arranged to compare the feedback signal with the threshold value signal and to change the state of the electronically controlled switch of the switched mode power supply to the first state responsive to the feedback signal falling below the threshold value signal, wherein the feedback signal is responsive to the instantaneous output voltage of the switched mode power supply and the threshold value signal is responsive to the reference input signal; a reset circuit arranged to change the state of the electronically controlled switch of the switched mode power supply to the second state responsive to a predetermined condition; and an adjustment circuit comprising a low pass filter and arranged to output one of the threshold value signal and the feedback signal, the adjustment circuit arranged to adjust the output one of the threshold value signal and the feedback signal so as to reduce the difference between the reference input signal and the average output voltage of the switched mode power supply responsive to the low pass filter.

Certain embodiments enable a hysteretic power converter comprising: a reference input signal; a switched mode power supply comprising an inductor and an electronically controlled switch, wherein the output of the switched mode power supply increases responsive to a first state of the electronically controlled switch and decreases responsive to a second state of the electronically controlled switch, the second state opposing the first state; a comparator coupled to a feedback signal and a threshold value signal and arranged to compare the feedback signal with the threshold value signal and to change the state of the electronically controlled switch of the switched mode power supply to the first state responsive to the feedback signal falling below the threshold value signal, wherein the feedback signal is responsive to the instantaneous output voltage of the switched mode power supply and the threshold value signal is responsive to the reference input signal; a reset circuit arranged to change the state of the electronically controlled switch of the switched mode power supply to the second state responsive to a predetermined condition; and an adjustment circuit comprising a low pass filter and arranged to output one of the threshold value signal and the feedback signal, the adjustment circuit arranged to adjust the output one of the threshold value signal and the feedback signal so as to reduce the difference between the reference input signal and the average output voltage of the switched mode power supply responsive to the low pass filter.

In certain further embodiments the adjustment circuit is arranged to output the threshold value signal, and wherein the adjustment circuit comprises: a differential amplifier, a first input of the differential amplifier coupled to the reference input signal and a second input of the differential amplifier coupled to the output of the switched mode power supply, the differential amplifier arranged to output an amplified difference; and a summation circuit coupled to the output of the differential amplifier and arranged to subtract the output of the differential amplifier from the reference input signal, the output of the summation circuit coupled to provide the output threshold value signal to the comparator, wherein the low pass filter is coupled to one of the second input of the differential amplifier, the output of the differential amplifier and the output of the summation circuit. In certain yet further embodiments the hysteretic power converter further comprises a limit circuit serially connected within the adjustment circuit so as to limit the range of adjustment of the threshold value signal to not exceed predetermined limits.

In certain further embodiments the adjustment circuit is arranged to output the feedback signal, and wherein the adjustment circuit comprises: a differential amplifier, a first input of the differential amplifier coupled to the reference input signal and a second input of the differential amplifier coupled to the output of the switched mode power supply, the differential amplifier arranged to output an amplified difference; and a summation circuit coupled to the output of the differential amplifier and arranged to add the instantaneous output voltage of the switched mode power supply to the output of the differential amplifier, the output of the summation circuit coupled to provide the output feedback signal to the comparator, wherein the low pass filter is coupled to one of the second input of the differential amplifier, the output of the differential amplifier and the output of the summation circuit. In certain yet further embodiments the hysteretic power converter further comprises a limit circuit serially connected within the adjustment circuit so as to limit the range of adjustment of the feedback signal to not exceed predetermined limits.

Independently, a method of controlling a hysteretic converter is enabled so that the average output voltage approaches the value of an input reference value, the method comprising: providing a switched mode power supply comprising an inductor and an electronically controlled switch, wherein the output of the switched mode power supply increases responsive to a first state of the electronically controlled switch and decreases responsive to a second state of the electronically controlled switch, the second state opposing the first state; comparing a feedback signal with a threshold value signal and changing the state of the electronically controlled switch of the switched mode power supply to the first state responsive to the feedback signal falling below the threshold value signal, wherein the feedback signal is responsive to the instantaneous output voltage of the provided switched mode power supply and wherein the threshold value signal is responsive to an input reference signal; changing the state of the electronically controlled switch of the switched mode power supply to the second state responsive to a predetermined condition; and adjusting one of the threshold value signal and the feedback signal so as to reduce the difference between the input reference value and the average output voltage, wherein the adjusting is responsive to a low pass filter.

In certain further embodiments the adjusting is of the threshold value signal, and wherein the adjusting comprises: amplifying a difference between the input reference value and the output voltage of the provided switched mode power supply to output an amplified difference; subtracting the amplified difference from the input reference value to output the adjusted threshold value signal; and applying the low pass filter to one of the output voltage prior to the amplifying the difference between the input reference value and the output voltage, the output amplified difference and the output adjusted threshold value signal. In certain yet further embodiments the method further comprises comprising limiting the range of adjustment of the threshold value signal to not exceed predetermined limits.

In certain further embodiments the adjusting is of the feedback signal, and wherein the adjusting comprises: amplifying a difference between the reference input signal and the output voltage of the provided switched mode power supply to output an amplified difference; summing the output voltage of the provided switched mode power supply with the amplified difference to output the adjusted feedback signal; and applying the low pass filter to one of the output voltage prior to the amplifying the difference between the input reference value and the output voltage, the output amplified difference and the output adjusted feedback signal. In yet further certain embodiments the method further comprises limiting the range of adjustment of the feedback signal to not exceed predetermined limits.

Independently a hysteretic power converter is enabled, comprising: a switched mode power supply comprising an inductor and an electronically controlled switch, wherein the output of the switched mode power supply increases responsive to a first state of the electronically controlled switch and decreases responsive to a second state of the electronically controlled switch, the second state opposing the first state; a feedback circuit; a comparator coupled to the feedback circuit, the feedback circuit arranged to feedback to a first input of the comparator a representation of the output of the switched mode power supply, the comparator arranged to compare the voltage on the first input to a reference signal coupled to the second input of the comparator and to output a control signal to the electronically controlled switch responsive to the comparison of the voltage on the first input to the reference signal, the feedback circuit, comparator and electronically controlled switch comprising a hysteretic loop; and an adjustment circuit arranged to add an offset to one of the first input and the second input of the comparator so as to reduce the difference between the average output voltage and a regulation set point voltage, the adjustment circuit comprising a low pass filter and arranged so as not to substantially impact the speed of response of the hysteretic loop.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A illustrates a high level schematic diagram of a hysteretic converter according to the prior art;

FIG. 1B illustrates certain signals and voltage levels of the hysteretic converter of FIG. 1A;

DETAILED DESCRIPTION OF PREFERRED EMBODIMENTS

Figure 2A:
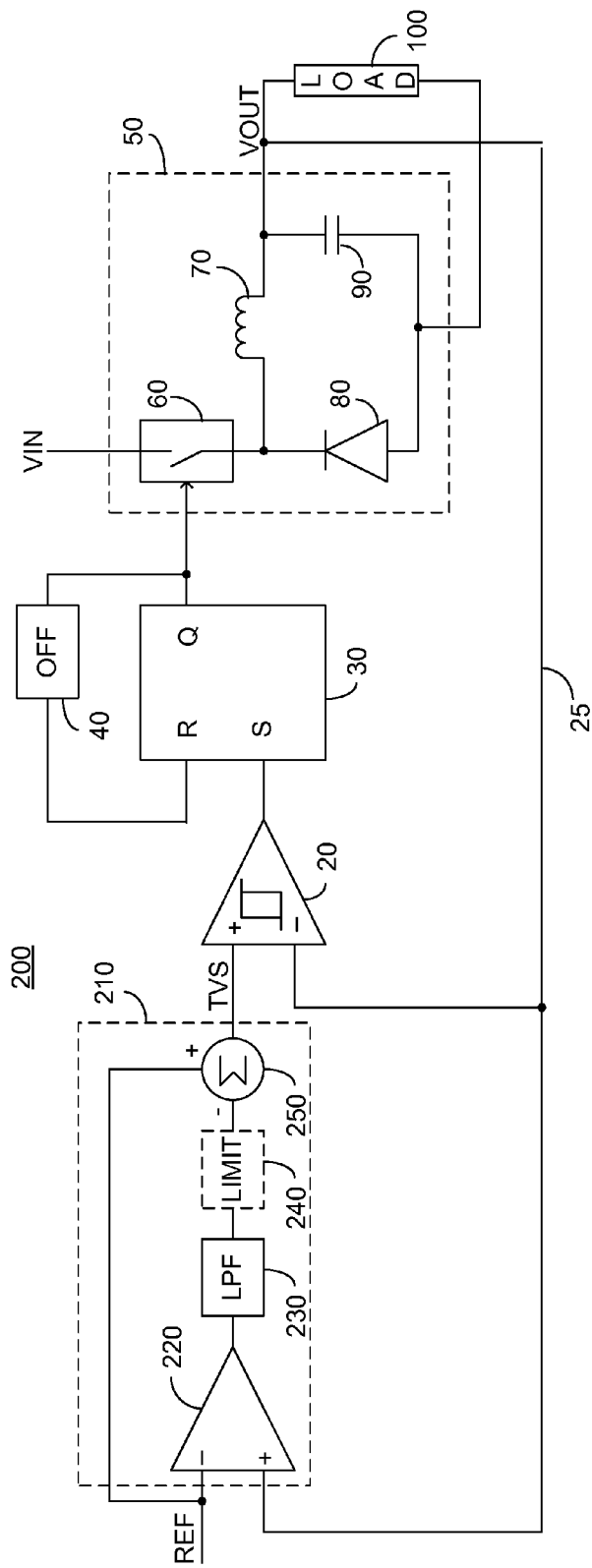
FIG. 2A illustrates a high level schematic diagram of an exemplary embodiment of a hysteretic converter comprising an adjustment circuit with a low pass filter arranged to adjust the threshold value signal fed to the hysteretic converter comparator so as to reduce the difference between the reference input signal and the average output voltage.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The embodiments presented herein are described in particular in relation to a buck switched mode power converter, however this is not meant to be limiting in any way. The use of any of a boost converter, fly back converter, buck boost converter, or any other switched mode power supply without limitation, is specifically contemplated herein. In particular, any switched mode power supply exhibiting an electronically controlled switch wherein in a first state of the electronically controlled switch the output voltage VOUT increases, and in the second state of the electronically controlled switch, opposite the first state, the output voltage VOUT decreases, may be utilized as described herein, without limitation.

Figure 2B:
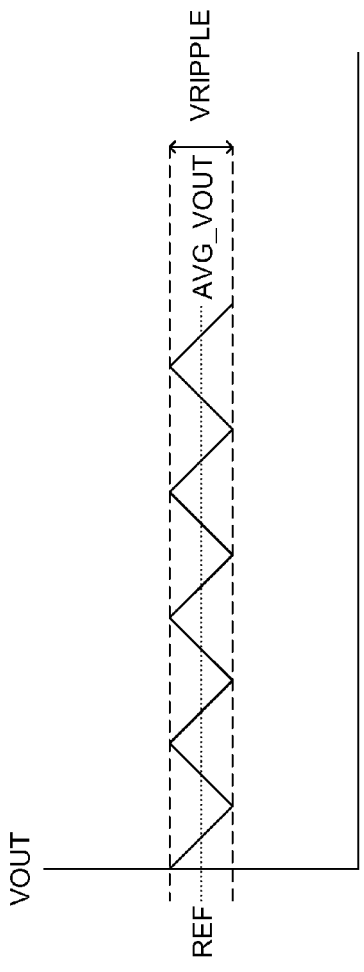
FIG. 2B illustrates certain signals and voltage levels of the hysteretic converter of FIG. 2A.

FIG. 2A illustrates a high level schematic diagram of an exemplary embodiment of a hysteretic converter 200 comprising an adjustment circuit 210 with a low pass filter 230 arranged to adjust a threshold value signal TVS fed to comparator 20 so as to reduce the difference between a reference input signal REF and the average output voltage AVG_VOUT. FIG. 2B illustrates certain waveforms of hysteretic converter 200 of FIG. 2A, with the x-axis representing time and the y-axis representing the amplitude of output voltage VOUT, FIGS. 2A and 2B being described herein together.

In particular, hysteretic converter 200 comprises: a comparator 20 illustrated as a Schmidt trigger comparator; an RS flip flop 30; an off time control circuit 40; a switched mode power supply 50, illustrated without limitation without limitation as a buck converter constituted of an electronically controlled switch 60, an inductor 70, a unidirectional electronic valve 80 illustrated without limitation as a diode and an output capacitor 90; and adjustment circuit 210. Additionally a load 100 is further illustrated. Adjustment circuit 210 comprises a differential amplifier 220, low pass filter 230, an optional limit circuit 240 and a summation circuit 250.

An input voltage VIN is connected to a first end of electronically controlled switch 60, and a second end of electronically controlled switch 60 is connected to a first end of inductor 70 and to the cathode of unidirectional electronic valve 80. A second end of inductor 70, denoted output voltage VOUT, is connected to a first end of output capacitor 90 and to a first end of load 100. A second end of load 100, a second end of output capacitor 90 and the anode of unidirectional electronic valve 80 are commonly connected. The output of comparator 20 is connected to the set input of RS flip flop 30 and the Q output of RS flip flop 30 is connected to the control input of electronically controlled switch 60 of switched mode power supply 50. An input of off time control circuit 40 is connected to the Q output of RS flip flop 30, and the output of off time control circuit 40 is connected to the reset input of RS flip flop 30.

Output voltage VOUT is connected to the inverting input of comparator 20 via a feedback circuit 25 and to the inverting input of differential amplifier 220. The output of differential amplifier 220 is connected to the input of low pass filter 230, and the output of low pass filter 230 is connected to the input of optional limit circuit 240. The output of optional limit circuit 240 is connected to the minus input of summation circuit 250, and the output of summation circuit 250 is fed to the non-inverting input of comparator 20, and denoted threshold value signal TVS. A reference voltage REF is connected to the non-inverting input of differential amplifier 220 and to the plus input of summation circuit 250.

Adjustment circuit 210 is particularly illustrated with low pass filter 230 connected between the output of differential amplifier 220 and the input of summation circuit 250, however this is not meant to be limiting in any way. Low pass filter 230 may be connected at the non-inverting input of differential amplifier 220, or between the output of summation circuit 250 and the non-inverting input of comparator 20 without exceeding the scope. Low pass filter 230 is arranged to provide an average of the voltage difference between the reference voltage and output voltage by removing the effect of the output ripple voltage. In one embodiment, low pass filter 230 is set to several orders of magnitude less than the switching frequency of hysteretic converter 10 of FIG. 1A, thus providing rapid response to transients with significantly slower adjustment of threshold value signal TVS.

In operation, adjustment circuit 210 adjusts threshold value signal TVS input to comparator 20 so as to reduce the difference between reference input signal REF and the average output voltage AVG_VOUT, the adjustment responsive to low pass filter 230. The operation of comparator 20, RS flip flop 30, off time control circuit 40 and switched mode power supply 50 are as described above, and in the interest of brevity are not further described. Average output voltage AVG_VOUT is typically equal to threshold value signal TVS plus ½ VRIPPLE, expressed as:

$$AVG\_VOUT=TVS+VRIPPLE/2 \quad (1)$$

Differential amplifier 220 is set to exhibit a gain of K, which in one particular embodiment is set to 5. Adjustment circuit 210, responsive to low pass filter 230, irrespective of placement, and ignoring any limiting action of limit circuit 240, exhibits output TVS whose value is:

$$TVS=REF*(1+K)-K*AVG\_VOUT \quad (2)$$

where average voltage AVG_VOUT is created by the operation of low pass filter 230, and is equal over time to the average of output voltage VOUT. After substitution of EQ. 1 into EQ. 2, $$AVG\_VOUT=REF+1/(K+1)*(VRIPPLE/2) \quad (3)$$

Thus, by adjusting the value of gain K, average output voltage AVG_VOUT approaches the value of REF, and the offset factor of ½ of the ripple voltage can be minimized or effectively removed.

Optional limit circuit 240 is optionally provided to ensure that the ripple correction does not overcompensate during start up or transient conditions, and optional limit circuit 240 thus operates to limit the contribution of adjustment circuit 210 so that the range of adjustment of threshold value signal TVS does not exceed predetermined limits, typically so as not to exceed a few percent of the desired output voltage VOUT.

Advantageously, the arrangement of adjustment circuit 210 does not appreciably impact the speed of response of the hysteretic loop formed by feedback circuit 25, comparator 20, RS flip flop 30 and electronically controlled switch 60. In particular, the response of the hysteretic loop of hysteretic converter 200 is preferably not substantially impacted, since adjustment circuit 210 is preferably arranged to adjust the reference signal fed to comparator 20 and is not arranged in series with the hysteretic loop.

Figure 3A:
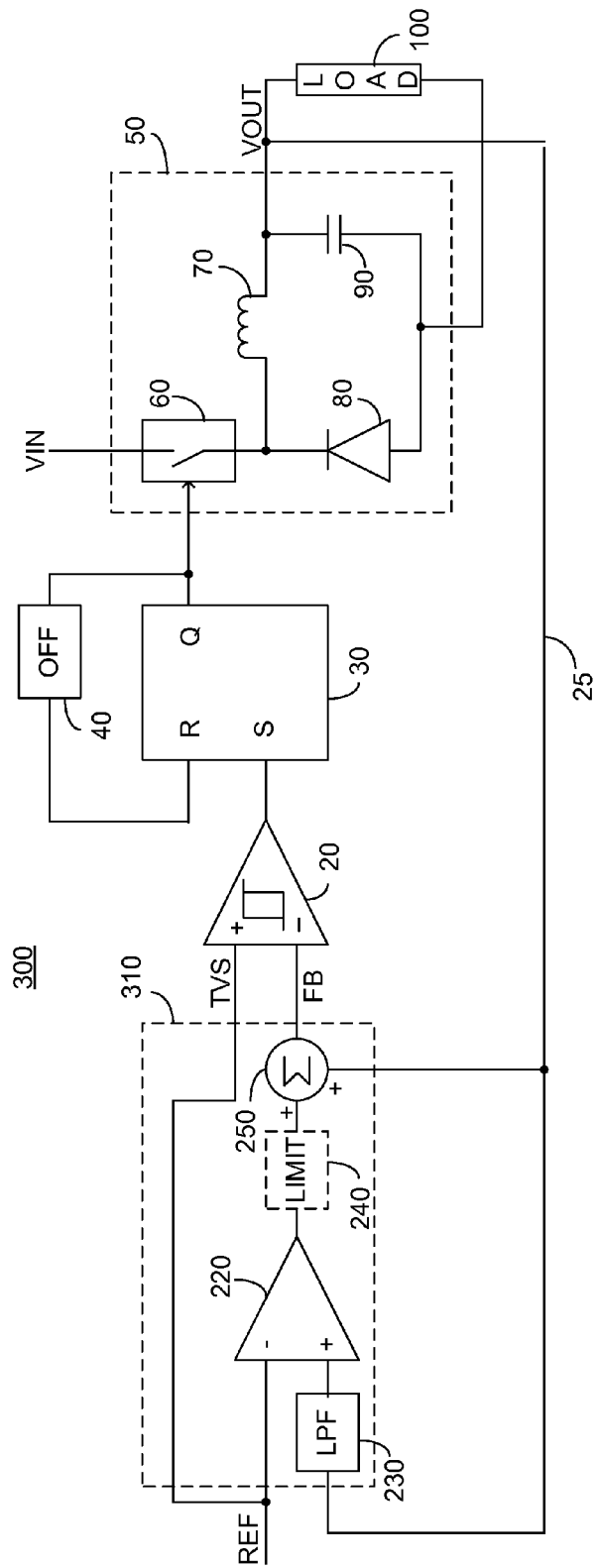
FIG. 3A illustrates a high level schematic diagram of an exemplary embodiment of a hysteretic converter comprising an adjustment circuit with a low pass filter arranged to adjust a function of the output voltage fed to the hysteretic converter comparator so as to reduce the difference between the reference input signal and the average output voltage.
Figure 3B:
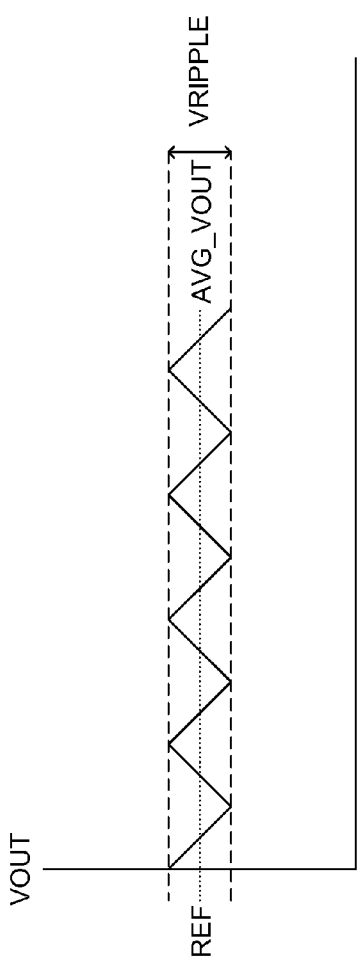
FIG. 3B illustrates certain signals and voltage levels of the hysteretic converter of FIG. 3A.

FIG. 3A illustrates a high level schematic diagram of an exemplary embodiment of a hysteretic converter 300 comprising an adjustment circuit 310 with a low pass filter 230 arranged to adjust the function of output voltage VOUT fed to comparator 20 so as to reduce the difference between a reference input signal REF and the average output voltage AVG_VOUT. FIG. 3B illustrates certain waveforms of hysteretic converter 300 of FIG. 3A, with the x-axis representing time and the y-axis representing the amplitude of output voltage VOUT, FIGS. 2A and 2B being described herein together.

In particular, hysteretic converter 300 comprises: a comparator 20 illustrated as a Schmidt trigger comparator; an RS flip flop 30; an off time control circuit 40; a switched mode power supply 50, illustrated without limitation without limitation as a buck converter constituted of an electronically controlled switch 60, an inductor 70, a unidirectional electronic valve 80 illustrated without limitation as a diode and an output capacitor 90; and adjustment circuit 310. Additionally a load 100 is further illustrated. Adjustment circuit 310 comprises a differential amplifier 220, low pass filter 230, an optional limit circuit 240 and a summation circuit 250.

An input voltage VIN is connected to a first end of electronically controlled switch 60, and a second end of electronically controlled switch 60 is connected to a first end of inductor 70 and to the cathode of unidirectional electronic valve 80. A second end of inductor 70, denoted output voltage VOUT, is connected to a first end of output capacitor 90 and to a first end of load 100. A second end of load 100, a second end of output capacitor 90 and the anode of unidirectional electronic valve 80 are commonly connected. The output of comparator 20 is connected to the set input of RS flip flop 30 and the Q output of RS flip flop 30 is connected to the control input of electronically controlled switch 60 of switched mode power supply 50. An input of off time control circuit 40 is connected to the Q output of RS flip flop 30, and the output of off time control circuit 40 is connected to the reset input of RS flip flop 30.

Output voltage VOUT is connected to the inverting input of comparator 20 via a feedback circuit 25, to the inverting input of differential amplifier 220 via low pass filter 230, and to the minus input of summation circuit 250. The output of differential amplifier 220 is connected to the input of optional limit circuit 240, the output of optional limit circuit 240 is connected to the plus input of summation circuit 250, and the output of summation circuit 250 is fed to the inverting input of comparator 20, as feedback signal FB. A reference voltage REF is connected to the non-inverting input of differential amplifier 220 and to the non-inverting input of comparator 20, and further denoted threshold value signal TVS for consistency. Threshold value signal TVS is however fixed and equal to reference signal REF.

Adjustment circuit 310 is particularly illustrated with low pass filter 230 connected before the input of differential amplifier 220, however this is not meant to be limiting in any way. Low pass filter 230 may be connected at the output of differential amplifier 220, or between the output of summation circuit 250 and the inverting input of comparator 20 without exceeding the scope. Low pass filter 230 is arranged to provide an average of the voltage difference between the reference voltage and output voltage by removing the effect of the output ripple voltage. In one embodiment, low pass filter 230 is set to several orders of magnitude less than the switching frequency of hysteretic converter 10 of FIG. 1A, thus providing rapid response to transients with significantly slower adjustment of feedback signal FB to comparator 20.

In operation, adjustment circuit 310 is similar to the operation of adjustment circuit 210 of FIG. 2A with the exception that the feedback function of output voltage VOUT is adjusted as feedback signal FB in place of adjustment of threshold value signal TVS. Adjustment is performed by summation circuit 250 which does not add appreciable delay to the feedback signal, and the adjustment acts so as to reduce the difference between reference input signal REF and the average output voltage AVG_VOUT, the adjustment responsive to low pass filter 230.

The operation of comparator 20, RS flip flop 30, off time control circuit 40 and switched mode power supply 50 are as described above, and in the interest of brevity are not further described. The output of differential amplifier 220 of adjustment circuit 310, comprising an offset correction signal, is added to the fed back VOUT signal by summation circuit 250. This is contrasted with adjustment circuit 210 of FIG. 2A, wherein the output of differential amplifier 220, comprising an offset correction signal, is subtracted from the reference signal. Average output voltage AVG_VOUT is nearly equal to threshold value signal TVS since an offset of ½ VRIPPLE is added to the fed back VOUT signal by summation circuit 250 prior to being connected to the inverting input of comparator 20 as signal FB as will be described further below. Differential amplifier 220 is set to exhibit a gain of K, which in one particular embodiment is set to 5. Adjustment circuit 310, responsive to low pass filter 230, irrespective of placement, and ignoring any limiting action of limit circuit 240, exhibits output feedback signal FB whose value is:

$$FB = K^*(AVG\_VOUT - REF) + VOUT \qquad (4)$$

where average voltage AVG_VOUT is created by the operation of low pass filter 230, and is equal over time to the average of output voltage VOUT. Feedback signal FB exhibits a minimum value, denoted $FB_{min}$, since when FB falls to below TVS, transition of comparator 20 occurs. As described above in relation to FIGS. 1A, 1B, VOUT thus presents at least a minimum voltage, denoted herein as $VOUT_{min}$. Restating EQ. 1 above by substituting $VOUT_{min}$ for TVS:

$$AVG\_VOUT = VOUT_{min} + VRIPPLE/ \qquad (5)$$

As indicated above, and as seen in EQ. 4, FB is responsive to VOUT, and exhibits no other high frequency variables, such that $FB_{min}$ coincides with $VOUT_{min}$. Substituting EQ. 5 into EQ. 4 at $FB = FB_{min}$, $VOUT = VOUT_{min}$:

$$FB_{min} = [(1+K)^*AVG\_VOUT] - (VRIPPLE/2) - REF^*K \qquad (6)$$

Solving EQ. 6 for AVG_VOUT at the transition of comparator 20 which occurs when FBmin=REF results in:

$$AVG\_VOUT = REF + \{(VRIPPLE/2)/(1+K)\} \qquad (7)$$

Thus, by adjusting the value of gain K, average output voltage AVG_VOUT approaches the value of REF, and the offset factor of ½ of the ripple voltage can be minimized or effectively removed, as illustrated in EQ. 7.

Optional limit circuit 240 is optionally provided to ensure that the ripple correction does not overcompensate during start up or transient conditions, and optional limit circuit 240 thus operates to limit the contribution of adjustment circuit 310 so that the range of adjustment of feedback signal FB does not exceed predetermined limits, typically so as not to exceed a few percent of the desired output voltage VOUT.

Advantageously, the arrangement of adjustment circuit 310 does not appreciably impact the speed of response of the hysteretic loop formed by feedback circuit 25, comparator 20, RS flip flop 30 and electronically controlled switch 60. In particular, the response of the hysteretic loop of hysteretic converter 300 is preferably not substantially impacted, since adjustment circuit 310 having low pass filter 230 is preferably arranged to adjust the output signal, fed by feedback circuit 25 to comparator 20, via fast acting summation circuit 250. Thus, the slow acting portion of adjustment circuit 310 is not arranged in series with the fast responding hysteretic loop.

Figure 4:
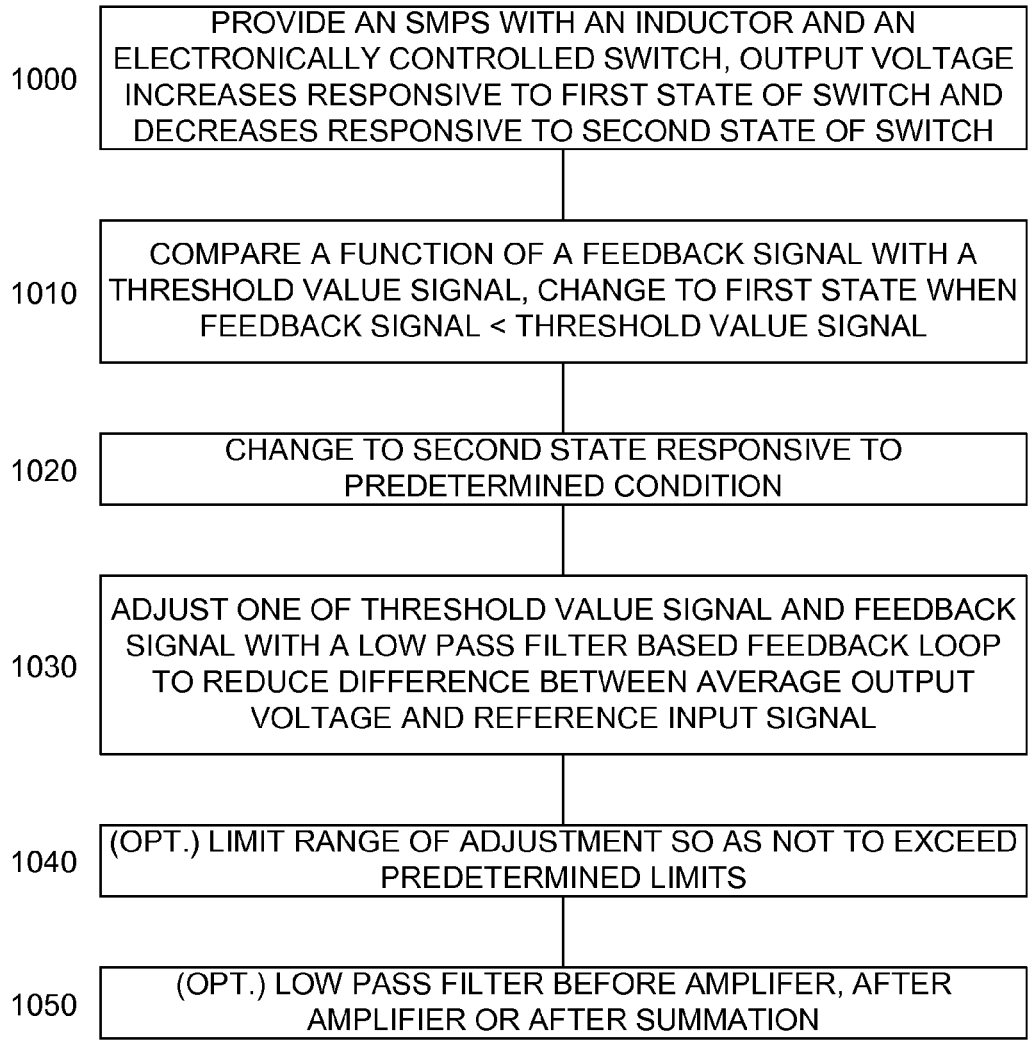
FIG. 4 illustrates a high level flow chart of a method of operation of either the hysteretic converter of FIG. 2A or the hysteretic converter of FIG. 3A to reduce the difference between the reference input signal and the average output voltage.

FIG. 4 illustrates a high level flow chart of a method of operation of either the hysteretic converter of FIG. 2A or the hysteretic converter of FIG. 3A to reduce the difference between the reference input signal and the average output voltage. In stage 1000, a switched mode power supply is provided having an inductor and an electronically controlled switch, wherein the output voltage of the switched mode power supply increases responsive to a first state of the electronically controlled switch and decreases responsive to a second state of the electronically controlled switch, the second state opposite the first state.

In stage 1010, a function of a feedback signal is compared with a threshold value signal, and the electronically controlled switch is changed to the first state responsive to the comparison when the feedback signal is less than the threshold value signal. The feedback signal is responsive to the instantaneous output voltage of the provided switched mode power supply of stage 1000, the term instantaneous being indicative that no additional active stages are added between the comparing circuitry and the output of the switched mode power supply. In stage 1020, the electronically controlled switch is changed to the second state responsive to a predetermined condition, such as the instantaneous output voltage exceeding a higher limit, current through the inductor exceeding a certain value, or a predetermined time limit, without limitation.

In stage 1030, one of the threshold value signal and the feedback signal function are adjusted by a low pass filter based feedback loop so as to reduce the difference between the average output voltage and the reference input signal. In one embodiment, wherein the threshold value signal is adjusted, the adjustment is constituted of: amplifying a difference between the reference input signal and the output voltage to output an amplified difference; and subtracting the amplified difference from the reference input signal to output the adjusted threshold value signal. In another embodiment, wherein the feedback signal is adjusted, the adjustment is constituted of: amplifying a difference between the reference input signal and the output voltage to output an amplified difference; and adding the instantaneous output voltage to the amplified difference to output the adjusted feedback signal.

In optional stage 1040, any adjustment of stage 1030 is limited so as not to exceed predetermined limits.

In optional stage 1050, the low pass filter of the adjustment of stage 1030 to any of: before a differential amplification, such as before differential amplifier 220; before a summation, such as summation circuit 250; and after the summation, such as after summation circuit 250 and before comparator 20.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A hysteretic power converter comprising:
a reference input signal;
a switched mode power supply comprising an inductor and an electronically controlled switch, wherein the output of the switched mode power supply increases responsive to a first state of the electronically controlled switch and decreases responsive to a second state of the electronically controlled switch, said second state opposing said first state;
a comparator coupled to a feedback signal and a threshold value signal and arranged to compare the feedback signal with the threshold value signal and to change the state of the electronically controlled switch of said switched mode power supply to the first state responsive to the feedback signal falling below the threshold value signal, wherein the feedback signal is responsive to the instantaneous output voltage of said switched mode power supply and the threshold value signal is responsive to said reference input signal;
a reset circuit arranged to change the state of the electronically controlled switch of said switched mode power supply to the second state responsive to a predetermined condition; and
an adjustment circuit comprising a low pass filter and arranged to output one of the threshold value signal and the feedback signal, said adjustment circuit arranged to adjust the output one of the threshold value signal and the feedback signal so as to reduce the difference between the reference input signal and the average output voltage of said switched mode power supply responsive to the low pass filter.

2. The hysteretic power converter according to claim 1, wherein said adjustment circuit is arranged to output the threshold value signal, and wherein said adjustment circuit comprises:

a differential amplifier, a first input of said differential amplifier coupled to the reference input signal and a second input of said differential amplifier coupled to the output of said switched mode power supply, said differential amplifier arranged to output an amplified difference; and
a summation circuit coupled to the output of said differential amplifier and arranged to subtract the output of said differential amplifier from said reference input signal, the output of said summation circuit coupled to provide the output threshold value signal to said comparator,
wherein said low pass filter is coupled to one of the second input of said differential amplifier, the output of said differential amplifier and the output of said summation circuit.

3. The hysteretic power converter according to claim 2, further comprising a limit circuit serially connected within said adjustment circuit so as to limit the range of adjustment of the threshold value signal to not exceed predetermined limits.

4. The hysteretic power converter according to claim 1, wherein said adjustment circuit is arranged to output the feedback signal, and wherein said adjustment circuit comprises:

a differential amplifier, a first input of said differential amplifier coupled to the reference input signal and a second input of said differential amplifier coupled to the output of said switched mode power supply, said differential amplifier arranged to output an amplified difference; and
a summation circuit coupled to the output of said differential amplifier and arranged to add the instantaneous output voltage of said switched mode power supply to the output of said differential amplifier, the output of said summation circuit coupled to provide the output feedback signal to said comparator,
wherein said low pass filter is coupled to one of the second input of said differential amplifier, the output of said differential amplifier and the output of said summation circuit.

5. The hysteretic power converter according to claim 4, further comprising a limit circuit serially connected within said adjustment circuit so as to limit the range of adjustment of the feedback signal to not exceed predetermined limits.

6. A method of controlling a hysteretic converter so that the average output voltage approaches the value of an input reference value, the method comprising:
providing a switched mode power supply comprising an inductor and an electronically controlled switch, wherein the output of the switched mode power supply increases responsive to a first state of the electronically controlled switch and decreases responsive to a second state of the electronically controlled switch, said second state opposing said first state;
comparing a feedback signal with a threshold value signal and changing the state of the electronically controlled switch of said switched mode power supply to the first state responsive to the feedback signal falling below the threshold value signal, wherein the feedback signal is responsive to the instantaneous output voltage of said provided switched mode power supply and wherein the threshold value signal is responsive to an input reference signal;
changing the state of the electronically controlled switch of said switched mode power supply to the second state responsive to a predetermined condition; and adjusting one of the threshold value signal and the feedback signal so as to reduce the difference between the input reference value and the average output voltage, wherein said adjusting is responsive to a low pass filter.

7. The method according to claim 6, wherein said adjusting is of the threshold value signal, and wherein said adjusting comprises:

amplifying a difference between the input reference value and the output voltage of said provided switched mode power supply to output an amplified difference;

subtracting the amplified difference from the input reference value to output the adjusted threshold value signal; and applying the low pass filter to one of the output voltage prior to said amplifying the difference between the input reference value and the output voltage, the output amplified difference and the output adjusted threshold value signal.

8. The method according to claim 7, further comprising limiting the range of adjustment of the threshold value signal to not exceed predetermined limits.

9. The method according to claim 6, wherein said adjusting is of the feedback signal, and wherein said adjusting comprises:

amplifying a difference between the reference input signal and the output voltage of said provided switched mode power supply to output an amplified difference;

summing the output voltage of said provided switched mode power supply with the amplified difference to output the adjusted feedback signal; and applying the low pass filter to one of the output voltage prior to said amplifying the difference between the input reference value and the output voltage, the output amplified difference and the output adjusted feedback signal.

10. The method according to claim 9, further comprising limiting the range of adjustment of the feedback signal to not exceed predetermined limits.

11. A hysteretic power converter, comprising:

a switched mode power supply comprising an inductor and an electronically controlled switch, wherein the output of the switched mode power supply increases responsive to a first state of the electronically controlled switch and decreases responsive to a second state of the electronically controlled switch, said second state opposing said first state;

a feedback circuit;

a comparator coupled to said feedback circuit, said feedback circuit arranged to feedback to a first input of the comparator a representation of the output of said switched mode power supply, said comparator arranged to compare the voltage on the first input to a reference signal coupled to the second input of the comparator and to output a control signal to said electronically controlled switch responsive to the comparison of the voltage on the first input to the reference signal, said feedback circuit, comparator and electronically controlled switch comprising a hysteretic loop; and an adjustment circuit arranged to add an offset to one of the first input and the second input of the comparator so as to reduce the difference between the average output voltage and a regulation set point voltage, said adjustment circuit comprising a low pass filter and arranged so as not to substantially impact the speed of response of said hysteretic loop.

\* \* \* \* \*